United States Patent Office 3,167,818
Patented Feb. 2, 1965

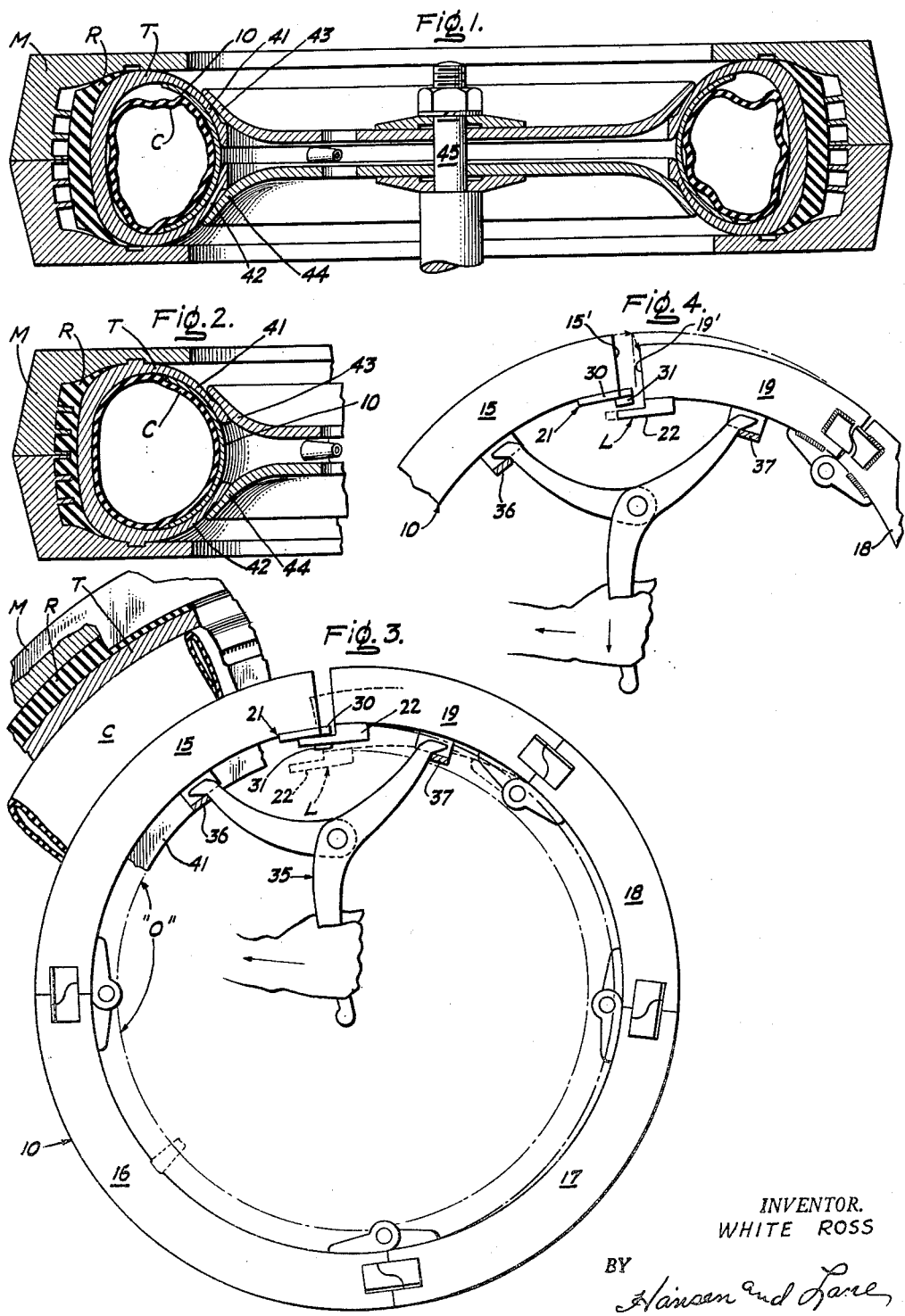

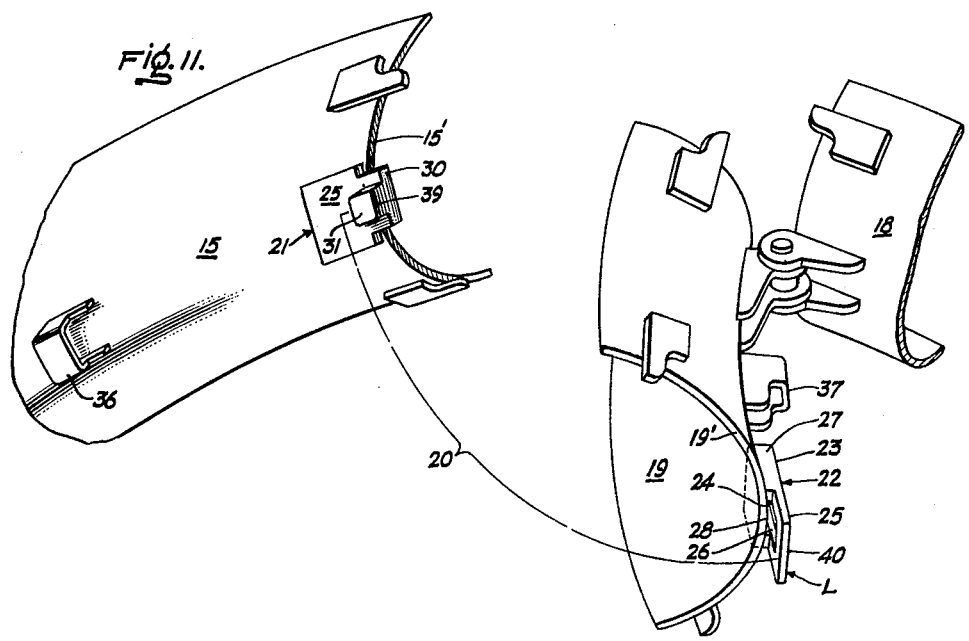
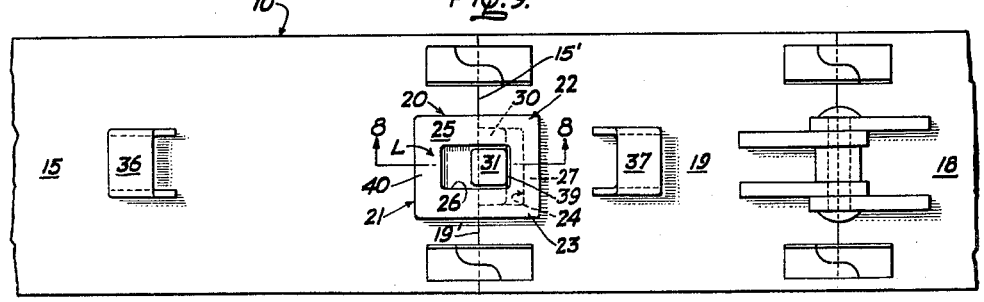
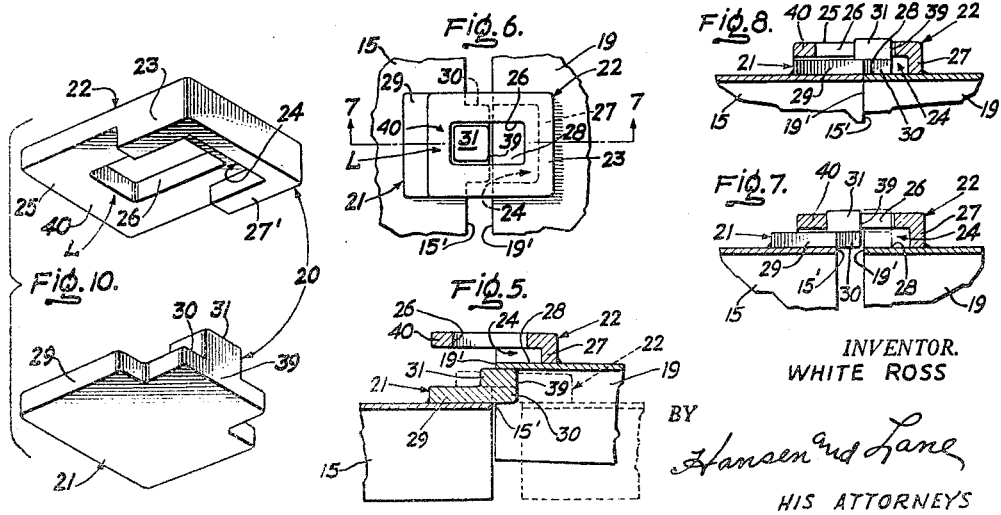

3,167,818
LATCH FOR CURING RIM
White Ross, Hayward, Calif., assignor to Elrick
Industries, Inc., Oakland, Calif.
Filed Mar. 19, 1962, Ser. No. 180,546
1 Claim. (Cl. 18—43)

This invention relates to collapsible curing rims and more particularly to a novel latch for such type curing rims.

In the art of retreading and/or recapping worn tires it is the practice to place the tire carcass within two half rim side walls joined to provide a conventional split matrix by which the tread design is impressed upon the new rubber during vulcanization thereof to the carcass. With the carcass so disposed an inflatable curing bag much like an inner tube is inserted into the carcass and backed up by a curing rim. Since the curing rim must be inserted after placement of the carcass and bag within the closed matrix it will be appreciated that an assemblable or a collapsible curing rim is most convenient. It is with collapsible curing rims of this nature that we are here concerned.

The present invention is embodied in a rim made of integrated segments collapsible into a compact unit, i.e., one which folds up into a size well within the orbit of the rim beads of the tire carcass which is to receive the curing rim. The invention herein concerns the provision of a novel securing means at the closing joint for a collapsible curing rim made up of a plurality of hingedly connected or integrated segments in which two unconnected terminal segments are so constructed as to readily align with each other and to be secured together.

The invention further contemplates a latch for securing segments of such a rim which automatically locks such terminal segments in aligned condition at the closing joint.

Since the terminal segments of the closing joint of hinged type curing rims are not such as to remain aligned at the abutting joint it is a further object of this invention to provide means for maintaining the meeting ends of the terminal segments in orbital alignment with each other.

It is a further object of this invention to provide novel interlocking latch halves on the terminal segments for securing them together once they are aligned with each other.

These and other objects and advantages of the present invention will become apparent from a reading of the following description in the light of the drawings in which:

FIG. 1 is a diametrical section through a tire mold having a tire, curing bag and curing rim arranged therein.

FIG. 2 is a partial section similar to FIG. 1 showing the tire inflated and molded.

FIG. 3 is a side view of a curing rim embodying the present invention and in partial section the mold, tire and curing bag in relative relation thereto.

FIG. 4 is a partial side view of a portion of FIG. 3 with parts thereof in a different position.

FIG. 5 is a large scale detail of the latch means of the present invention about to be interrelated.

FIG. 6 is a plan view of the latch means interrelated and about to be locked.

FIG. 7 is a section through FIG. 6.

FIG. 8 is a section similar to FIG. 7 with the latch means interlocked.

FIG. 9 is a plan view of a portion of two terminal segments of the curing rim showing the latch means interlocked as in FIG. 8.

FIG. 10 is a perspective view of the interlocking latch halves only.

FIG. 11 is a fragmentary perspective view of the terminal segments of the curing rim to illustrate the relation of the latch means therewith.

Referring first to FIG. 1 of the drawing a tire T with recap rubber R is shown arranged within two halves of a matrix or mold M. Within the tire T is a curing bag C in deflated condition and backed by a curing rim 10.

The curing rim 10 embodying the present invention is shown in FIG. 3, as being made up of a plurality of segments 15, 16, 17, 18 and 19 each of which, except for the first and last, is hingedly connected to an adjacent segment. The first and last segments 15 and 19, hereinafter referred to as terminal segments, when aligned with each other come together at what is commonly known as a closing joint. The line of separation at the closing joint between segments 15 and 19 is the terminal edges 15' and 19' respectively thereof. These abuttable edges become radially disposed relative to the rim 10 when the latter is in opened condition. In order to maintain the rim 10 in opened condition and to prevent internal collapsing thereof at the closing joint, the two terminal segments must be secured together.

The present invention is concerned with an interlocking latch 20 for the closing joint of the rim 10. The latch 20 comprises two interlocking members 21 and 22. For purposes of distinguishing the latch members from each other, member 21 is identified as a male member and member 22 as a female member. Each member 21 and 22 has a mounting portion adapted to overlie and to be secured to a terminal segment of the rim 10. The member 21 is secured as by welding to the inner peripheral surface of the terminal segment 15 and the member 22 is secured in like manner to the inner peripheral surface of the last terminal segment 19. Each member 21 and 22 has a portion thereof extending beyond the terminal edge 15' and 19' of the particular segment to which it is secured. These members 21 and 22 will now be described in specific detail.

The female member 22 has a mounting portion 23 so constructed as to form a socket 24 with the terminal segment 19 to which it is attached. As best seen in FIG. 10 the member 22 consists of a top or flat plate portion 25 having an open center 26 of rectangular shape so that the plate portion 25 is in the form of a loop L. The mounting portion 23 of the member 22 covers about one half of the loop or plate portion 25 and comprises a downwardly extending U-shaped flange 27 along the end and two sides of the plate 25 to form a recess 24' below the plate 25. The bottom face 27' of this three sided flange 27 is secured to the terminal segment 19 so that a portion 28 of the latter closes the bottom of the recess 24' formed by the flanges 27 to provide the aforementioned socket 24 with the female member 22. The open end of the socket 24 is at the terminal edge 19' of the segment 19 and substantially midway the ends of the plate 25 so that approximately one half of the loop L formed by the plate extends beyond the terminal edge 19' of the segment 19.

The male member 21 is a flat plate consisting of a mounting portion 29 having extending therefrom a tongue portion 30 of lesser width than the mounting portion. The tongue portion 30 is of such width as to have sliding fit between the side walls of the three sided flange 27 and the tongue is of such thickness as to fit into the socket 24 provided by the three sided flange 27 and the upper surface of the segment 19 confined thereby. The male member 21 further includes an upwardly projecting knob 31 on the top surface of the torgue portion 30 and partially onto the top of the mounting portion 29. The knob 31 is of square configuration and of a width to fit into rectangular open center 26 formed in the loop portion 25 of the female member 22.

In order to understand the purpose and operation of the present invention an explanation of the use of the curing rim and the stresses and pressures to which it is subjected when associated with a tire being recapped in the mold will now be given.

The curing rim 10 is collapsed or folded together to fit within the orbit O (FIG. 3) representing the annular diameter of the rim bead of a tire into which the curing rim is adapted to be placed. The tire T with recap rubber attached is in the mold or matrix M. The curing bag C in deflated condition is within the tire cavity. When the curing rim 10 is opened up each segment 15, 16, 17 and 18 is successively inserted between the rim beads of the tire and the shortest segment 19 is the last to swing toward open, i.e., annular condition as illustrated in FIG. 11. When the last segment 19 is opened up the portion 28 thereof overlies the knob 31 and tongue portion 30 the male member 21 on the segment 15 (see dotted lines FIG. 3 and sectional detail FIG. 5 of the drawings). In order to close the closing joint the rim 10 must be expanded and the latch members 21 and 22 interrelated preliminary to coming into interlocking relation.

This is accomplished with a manually operated leverage type, rim expanding tool 35 engaging lugs 36 and 37 affixed to the inner peripheral surfaces of the terminal segments 15 and 19. This is a well known method of expanding rims to align abutting terminal segments with each other. In the case of the latch means 20 of the present invention the curing rim 10 is expanded by the tool 35 as illustrated in FIGS. 3 and 4. The terminal segments 15 and 19 are thus spread to the position shown in FIGS. 3, 6 and 7 so that the terminal edge 19' of that portion 28, segment 19, can pass the fore edge 39 of the male member 21. The segment 19 can now swing into annular alignment with segment 15. However, the extended portion of the loop L must be registered with the knob 31 so that the knob can fit up into the opening 26 formed therein. When the two latch members 21 and 22 are thus interrelated the forward bight 40 of the plate 25 rests upon the top surface of the mounting portion 29 of the member 21 and limits expansion of the rim beyond readiness of the latch members to become interlocked. This assures alignment of the tongue 30 with the socket 24 when the leverage tool 35 is released and the rim 10 allowed to reassume normal or unexpanded condition. The tongue 30 thereupon slides into the socket 24 to thus secure the terminal segments 15 and 19 in annular alignment as their terminal edges 15' and 19' come into abutting relation with each other.

It should here be noted that the tongue 30 is confined between the plate 25 and part 28 of the segment 19 confined within the three sided wall or flange 27 forming the socket 24. Moreover, irrespective of any undue expansion of the rim 10, the tongue 30 is maintained in alignment with the socket 24. As long as the tongue 30 is even slightly within the socket 24 inward collapsing of the rim is prevented. Slight expansion can occur during inflation of the curing bag C as will now be explained.

Referring to FIG. 1 the tire T is initially placed in the mold M. The curing bag C is within the tire in deflated condition and the curing rim in closed condition is also within the tire to form or provide a base from which the curing bag, on inflation, will expand outwardly to press the new tread rubber R toward the matrix pattern of the mold M. It is during this outward expansion of the tire casing relative to the curing rim that an outward expanding stress is exerted on the curving rim 10.

Before inflation of the curing bag and in order to maintain the tire T centered and concentric to the mold, the rim beads 41 and 42 of the tire are clamped between two discs 43 and 44 and the latter drawn together on a center bolt 45 as shown in FIG. 1. This maintains the walls 46 and 47 of the tire T firmly against the annular surface of the curing rim during inflation of the curing bag C. As the bag C expands outwardly from the curing rim 10 the entire tire carcass is forced radially outward toward the matrix of the mold M. It will therefore be noted that the walls 46 and 47 of the tire, which frictionally engage the annular surface of the rim 10, tend to shift radially outward around the same. This creates a pull on the curing rim 10 causing the latter to expand radially outward. Such expanding stress tends to open up the closing joint between the terminal edges 15' and 19' of the terminal segments 15 and 19. This expansion is quite limited and does not normally exceed the length or projection of the tongue 30 beyond the terminal edge 15' of the segment upon which the male member 21 is secured. Consequently the tongue 30 merely shifts within the socket 24 of the female member 22 but still maintains the terminal segments 15 and 19 interrelated with each other. Thus the tire T is maintained centered and concentric to the matrix mold M during inflation of the curing bag C. Once the tread rubber R is pressed firmly against the matrix of the mold M and further outward movement of the side walls 46–47 ceases the curing rim 10 by its inherent nature returns to its normal annular condition with the closing joint closed, i.e., edges 15'–19' of the terminal segments in abutting relation. Thus the tongue 30 is fully within the socket 24 and the centered and concentric position of the tire which is now static relative to the mold M is established and will not change.

The clamp discs 43 and 44 can now be removed because the curing rim 10 is centered and concentric to the mold M and the entire arrangement static and ready for vulcanization of the tread rubber to the tire carcass.

Thereafter, as the curing bag C presses back against the closed rim 10 the latter provides a solid annular base for the curing bag while the latter maintains a constant outward pressure against the tire during vulcanizing of the tread rubber thereto.

After vulcanization and cooling of the mold, the curing bag is deflated and the leverage tool 35 is again employed to spread the terminal segments. The male and female latch members 21 and 22 are thereby shifted to remove the tongue 30 from the socket 24. When the bight portion 40 of the loop plate 25 engages the knob 31 on the male member 21 the person operated the leverage 35 is aware of the fact that the tongue 30 is just out of the socket 24. By swinging the leverage tool 35 fulcrum fashion about the lug 36 on segment 15, segment 19 can now be swung inwardly (counter clockwise FIGS. 3, 4 and 11) to disengage the two latch members 21 and 22 from each other.

While I have described my improved securing means for the closing joint of a curing rim in specific detail it will be appreciated by those skilled in the art that the same is susceptible to variations, alterations and/or modifications without departing from the spirit of my invention therein. I therefore desire to avail myself of all variations, alterations and/or modifications as fairly come within the purview of the appended claim.

What I claim as new and desire to protect by Letters Patent is:

A latch for the closing joint of a collapsible curing rim in which a pair of aligned matching, rim segments have a closeable segment swingable into normally end abutting relation to the other terminal segment to resist separation, each rim segment having a lug projecting from its back adjacent the abutting end thereof requiring the use of a manually operated tool consisting of a pair of connected lever members to simultaneously engage the lugs and push the same apart to separate the abuttable segments; the latch comprising a male latch member having a mounting portion secured on the back of the said other terminal segment between the related socket and the adjacent end of such terminal segment and a tongue on said mounting portion extending beyond the end of such terminal segment; a female member having a flat plate portion provided with downwardly extending flanges along both sides to substantially midway the ends of such plate portion secured to the back face of the closeable segment with the midway ends of said flanges aligned with the adjacent end of such closeable segment and providing a socket between the latter and said flat plate portion for receiving said tongue when the segments are aligned, said flat plate portion extending beyond the adjacent end of the closing segment such as to normally obstruct the latter from swinging into alignment with the terminal segment, the flat plate portion having an open center formed therein half overlying said socket and half beyond the adjacent end of the closing segment and having a bight at the end of said flat plate adapted to rest upon the mounting plate of said male latch member when the segments are separated, and a knob formed on the outer surface of said tongue half the size of the center opening in said flat plate portion and adapted to extend into that half of said center opening of said flat plate portion extending beyond the adjacent end of the closing segment when the segments are separated, and the bight of said first plate portion engages said mounting plate for aligning the segments for abutting relation and for engaging said knob to limit separation of the aligned segments a distance not exceeding the projection of said tongue beyond the end of the terminal segment.

References Cited in the file of this patent

UNITED STATES PATENTS

| | | |
|---|---|---|
| 673,382 | Chaffee | May 7, 1901 |
| 881,183 | Guyer | Mar. 10, 1908 |
| 1,274,610 | Schueler | Aug. 6, 1918 |
| 2,846,016 | Hanes | Aug. 5, 1958 |
| 2,850,768 | Elrick | Sept. 9, 1958 |
| 2,985,917 | Sunday | May 30, 1961 |

FOREIGN PATENTS

| | | |
|---|---|---|
| 554,511 | Germany | July 9, 1932 |